United States Patent [19]

Shumaker

[11] 4,017,348
[45] Apr. 12, 1977

[54] METHOD OF MAKING A COMPOSITE VEHICLE WHEEL

[76] Inventor: Gerald C. Shumaker, 2685 Cevennes Terrace, Xenia, Ohio 45385

[22] Filed: Mar. 10, 1975

[21] Appl. No.: 557,000

[52] U.S. Cl. .............................. 156/189; 156/192; 301/6 A; 301/6 W; 301/6 WB; 301/63 DS; 301/63 PW

[51] Int. Cl.² .......................................... B60B 5/02

[58] Field of Search ............... 301/5 R, 5.3, 5.7, 7, 301/8, 63 R, 63 C, 63 PW, 65, 6 A, 9 DH, 9 CN, 9 SC, 9 S, 11 R, 18, 17, 35 BJ, 6 W, 6 WB, 63 DS; 264/277, 257, 258; 156/190, 184, 189, 192

[56] References Cited

UNITED STATES PATENTS

| 262,990 | 8/1882 | Smith | 301/7 |
|---|---|---|---|
| 1,813,431 | 7/1931 | Shoemaker | 301/9 CN |
| 3,369,843 | 9/1975 | Prew | 301/63 PW |
| 3,829,162 | 8/1974 | Stimson | 301/6 A |
| 3,871,709 | 3/1975 | Eaton | 301/11 R |

*Primary Examiner*—Robert B. Reeves
*Assistant Examiner*—Charles A. Marmor
*Attorney, Agent, or Firm*—Joseph E. Rusz; Richard J. Killoren

[57] ABSTRACT

A composite wheel, for a heavy duty vehicle, having a barrel member with an inner layer of laminated tape structure wound on an out of round shaped mandrel. The barrel member has a plurality of formed sections of chopped fibers in an epoxy resin. The inner surface of each section conforms to the out of round tape structure and the outer surface forms the tire bead retainers and drop center portion of the wheel. An outer layer of laminated tape structure surrounds the formed sections. A wheel web member, made of chopped fibers in an epoxy resin has its outer surface conforming to the out of round configuration of the barrel member. The web member is made of two sections which are secured to the barrel member.

2 Claims, 14 Drawing Figures

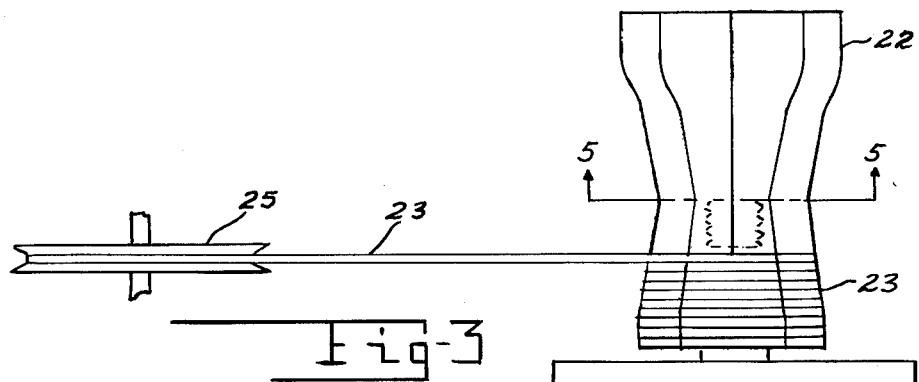
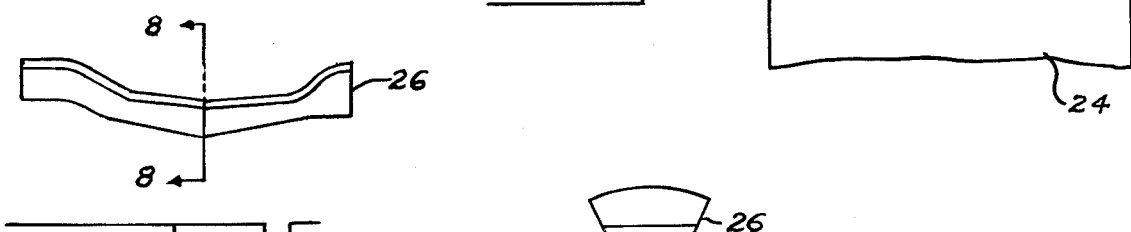
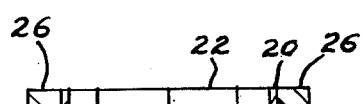
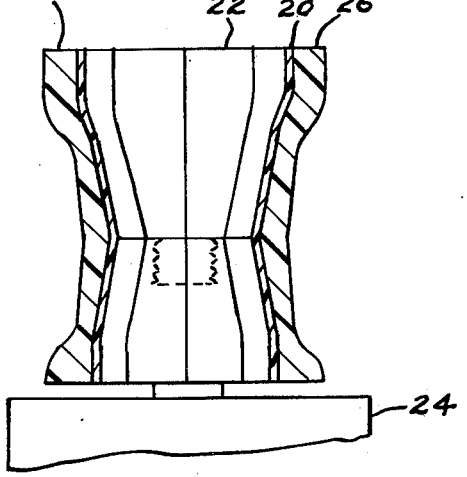
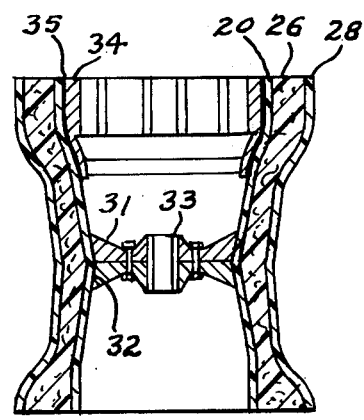

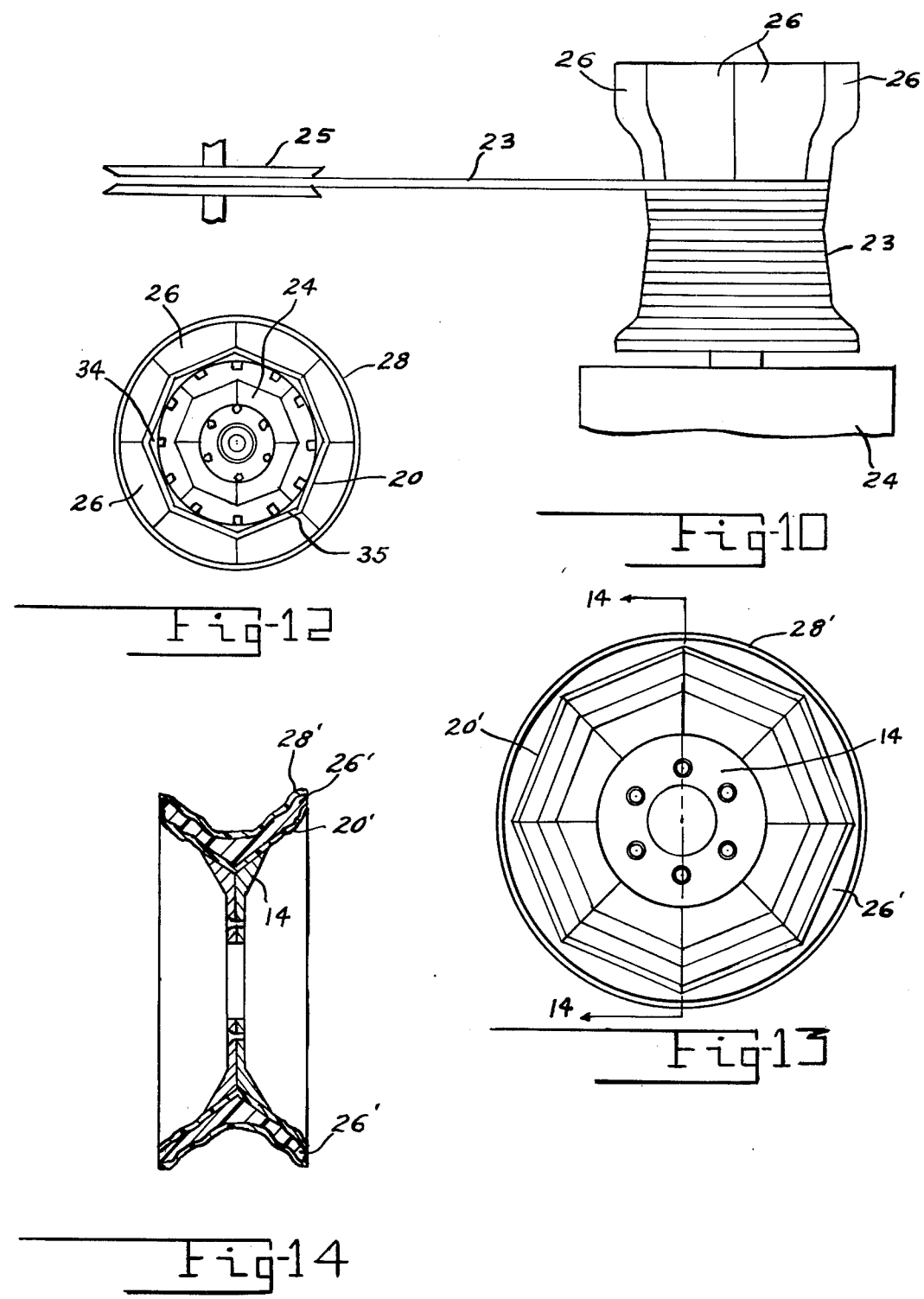

METHOD OF MAKING A COMPOSITE VEHICLE WHEEL

RIGHTS OF THE GOVERNMENT

The invention described herein may be manufactured and used by or for the Government of the United States for all governmental purposes without the payment of any royalty.

BACKGROUND OF THE INVENTION

This invention relates to a composite heavy duty wheel, such as used on certain ground vehicles and aircraft.

Composite wheels have certain advantages over metallic wheels in the area of weight reduction, fatigue life and operational life. Composite wheels also provide greater safety by reducing the accident rate due to wheel failure.

Prior art composite wheels have been made with laminated layers of material or by wet winding filaments on a mandrel. Such wheels are not entirely suitable for high torsion loads in heavy equipment which occur during the braking operation. Also, these wheels are normally limited to use with wheel temperatures below 300° F. There are no known composite wheels that will withstand the high temperatures and high torsional loads developed by the braking mechanism of a large moving vehicle.

BRIEF SUMMARY OF THE INVENTION

According to this invention, a vehicle wheel is provided with an out of round internal barrel member configuration used to transfer the torque from the brake mechanism to the wheel hub and tire. A brake adapter and heat resistant coating is provided to reduce the heat flow from the brake to the composite structure of wheels used on aircraft.

IN THE DRAWINGS

FIG. 3 is a schematic illustration showing the winding of the inner filament layer, of the wheel of FIGS. 1 and 2.

FIG. 6 is a side view of one of the chopped filament reinforced epoxy segments used in the device of FIGS. 1 and 2.

FIG. 7 is a left end view of the segment of FIG. 6.

FIG. 8 is a sectional view of the segment of FIG. 6, taken along the line 8—8.

FIG. 9 shows barrel member of the device of FIGS. 1 and 2 with the segments in place before the outer filament layer is applied.

FIG. 10 is a schematic illustration showing the winding of the outer filament layer of the wheel of FIGS. 1 and 2.

FIG. 11 is a schematic view of the device of FIGS. 1 and 2 with the outer winding complete and hub assembly and brake hub in place.

FIG. 12 is a brake end view of the finished wheel with the brake hub and wheel hub in place.

FIG. 13 is a side view of a modified wheel which may be used for land vehicles.

FIG. 14 is a sectional view of the device of FIG. 13 along the line 14—14.

DETAILED DESCRIPTION OF THE INVENTION

Figure 1:
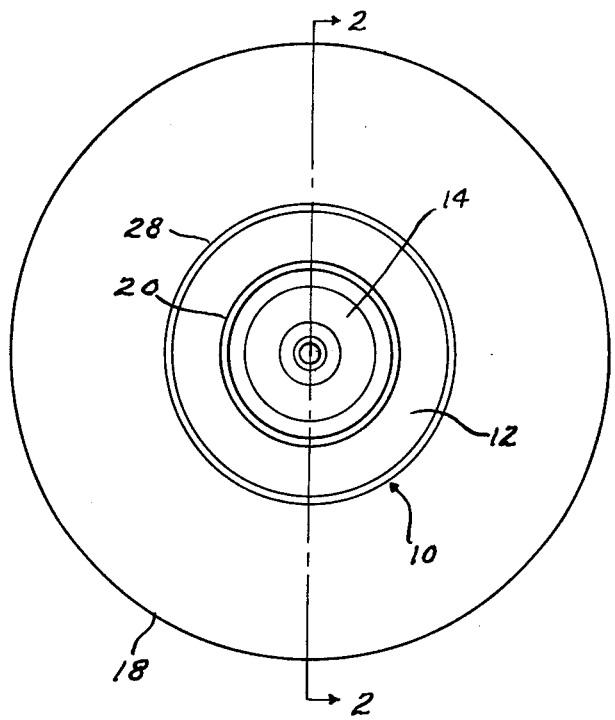
FIG. 1 is a partially schematic side view of an aircraft wheel assembly wherein the wheel of the invention is used.
Figure 2:
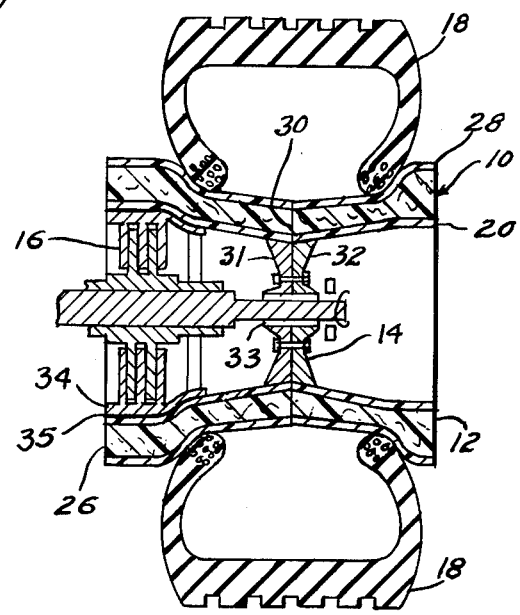
FIG. 2 is a partially schematic sectional view of the device of FIG. 1 taken along the line 2—2.
Figure 4:
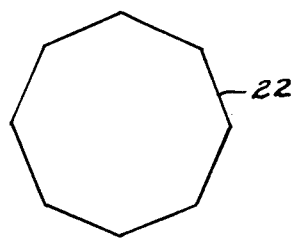
FIG. 4 shows a top view of the mandrel used in illustration of FIG. 3.
Figure 5:
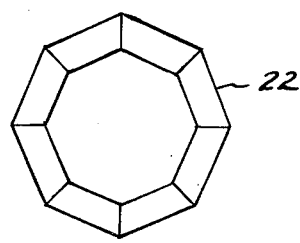
FIG. 5 is a sectional view of the mandrel of FIG. 3 taken along the line 5—5.

Reference is now made to FIGS. 1 and 2 of the drawing which shows an aircraft wheel 10 having a wheel barrel member 12, a hub assembly 14, a brake assembly 16 and an aircraft tire 18. The barrel member and hub assembly are constructed as shown in FIGS. 2–11.

An inner filament layer 20 is wound on a two part mandrel 22 in a conventional manner. The mandrel is rotated by means of a motor on a stand shown schematically at 24.

The layer 20 consists of 8 to 10 thicknesses of 9 mil filament reinforced epoxy resin tape 23 from a conventional spool supply system shown schematically at 25.

After the complete inner filament layer 20 is wound on the mandrel, the mandrel is enclosed in a vacuum bag and heated to 150° F. for 10 minutes in a precure compaction stage. The mandrel is then removed from the vacuum bag and replaced on stand 24. A plurality of preformed segments 26 are then positioned around the layer 20, as shown in FIG. 9. The segments 26, as shown in FIGS. 6–8, have an inner surface conforming to the flat portions of the inner layer 20, as formed by the mandrel, and their outer surface conforming to the desired tire retaining shape, shown in FIG. 2. The segments 26 are made of partially cured epoxy resin reinforced with chopped fibers. The segments may be secured to the layer 20 with an epoxy adhesive.

After the segments 26 are secured to the layer 20, an outer tape layer 28 is wound over the segments, as shown in FIG. 10. Layer 28 may consist of 20 to 30 thicknesses of 9 mil filament reinforced epoxy resin tape 23 from the spool supply system 25. The barrel member is placed in a vacuum bag for a 10 minute precure compaction stage, as described above, after each 10 thicknesses are applied.

When the second winding operation is completed, the two ends of the inner and outer layers are trimmed smooth with the ends of the segments 26. Then a first two part form, not shown, is placed within the barrel member and a second two part form, not shown, is placed around the outside of the barrel member to retain the shape of the barrel member during the curing operation. The barrel member is then cured in a conventional manner in an autoclave. If the mandrel is made of a material, such as aluminum, which still stand the heat of the curing process, it can be used for the inner support during the curing operation.

The particular curing operation depends upon the material used in the wheel structure. With the tape layers and wheel segments made of an/addition-type polyamide resin, such as a polyamide resin derived from caprolactam by the addition process, reinforced with carbon fibers, in the tape, and chopped fibers, in the segments, the segments are partially cured for approximately 10 minutes at a temperature of about 150° F. and a pressure of about 50 psi. The barrel member, after completion, is then cured for one hour at about 100 psi at a temperature between 235° F. and 260° F., then for three hours at about 100 psi at a temperature between 335° F. and 360° F. The barrel member is then cooled to about 120°. After cooling, the barrel member is given a post cure bake in an oven at about 500° F. For some applications, depending upon the materials used, some variations in the curing operation may be used.

After the post cure operation is completed and the barrel member is cooled, the forms are removed from the barrel member and the wheel is cut along the line 30, shown in FIG. 2, to permit mounting of the tire.

The hub assembly 14, shown in FIG. 2, has two parts 31 and 32 having their peripheral surfaces conforming to the out of round configuration of the inner surface of the barrel member. The part 31 is secured to one half of the barrel member with an epoxy adhesive and the part 32 is secured to the other half of the barrel member with an epoxy adhesive. An aligning sleeve member 33 is secured in one part of the hub assembly.

A brake hub 34 is positioned within the barrel member. A heat insulation layer 35, of a material such as asbestos or a ceramic is provided between the brake hub and barrel member. For some applications, the insulation can be a sprayed on silicone or fluorocarbon material. Since the brake hub is coupled to the wheel with an out of round configuration, the insulation layer need withstand only compression loads. The insulation layer and brake hub are secured with an epoxy adhesive.

While the device thus far described relates to an aircraft wheel, similar wheel structure could also be used for other wheels.

The device shown in FIGS. 13 and 14 relate to an automobile wheel. This wheel is similar to that described above, having an inner wound layer 20', segments 26' and an outer wound layer 28' constructed in substantially the same manner as described above, with the hub assembly 14' secured in substantially the same manner. However, since the brake assemblies in automobiles are normally separate from the wheel, this portion of the barrel member is not included. Also, the wheel need not be cut in two for mounting of the tire. The hub assembly will be made in two parts, however, to aid in retaining it within the barrel member.

While the hub assembly has been shown as made of metal, it could also be made of fiber reinforced epoxy material. Also lateral or bias fibers can be added.

Wheels, such as automobile wheels, which do not have to withstand as high temperature loads as aircraft wheels can be made of lower temperature materials, such as carbon fiber or fiberglass reinforced novalac epoxy with an anhydride cure. When this wheel construction is used for other wheel uses, some modification of the structure may be required. Shapes, other than that shown for the out of round configuration, may be used as long as the shape chosen is symmetrical around the axis of the wheel so as not to unbalance the wheel. However, wheel configurations, which require excessive material to provide the round outer wheel surface, are not desirable for use in aircraft wheels, though they might be desirable to provide increased wheel strength for other applications.

There is thus provided an improved composite vehicle wheel which permits the use of such wheels where high torsion loads are present.

I claim:

1. The method for constructing heavy duty wheels for vehicles, comprising: forming a barrel member by winding an inner layer of predetermined thickness of filament reinforced epoxy resin tape on a mandrel having a symmetrical out of round outer surface; subjecting the inner layer to a precure compaction stage; positioning a plurality of partially cured preformed segments of chopped fiber reinforced epoxy resin, having their inner surface conforming to the out of round configuration of the inner tape layer and their outer surface conforming to the desired tire receiving configuration of the wheel, around the periphery of the tape layer; winding an outer layer of a predetermined thickness of filament reinforced epoxy resin tape around the outer surface of said segments; subjecting the outer layer to precure compaction stages after each predetermined number of thicknesses of tape; curing the barrel member within a form in an autoclave at a predetermined temperature and pressure; removing the barrel member from the autoclave; allowing the barrel member to cool; securing a two part hub member within the barrel member with an epoxy adhesive.

2. The method as recited in claim 1, adapted for constructing wheels for use on aircraft comprising the additional steps of providing a layer of heat insulation to the out of round inner surface of a portion of the barrel member adapted for use with an aircraft brake; securing a brake hub, having an out of round outer surface conforming to the layer of insulation within the barrel member with an epoxy adhesive.

* * * * *